UNITED STATES PATENT OFFICE.

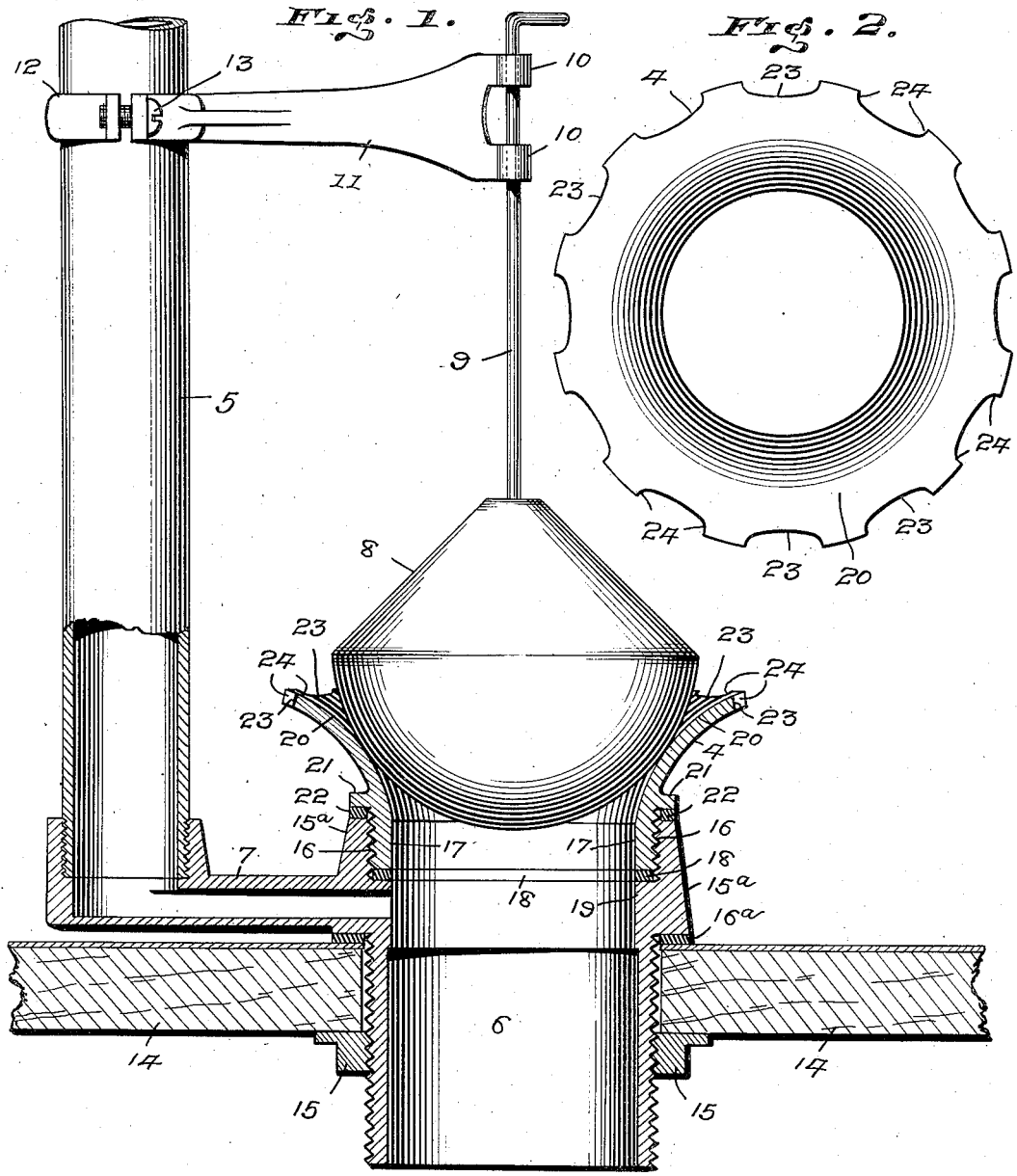

EUGENE BUSH, OF WASHINGTON, DISTRICT OF COLUMBIA.

VALVE CONSTRUCTION.

1,307,391.   Specification of Letters Patent.   Patented June 24, 1919.

Application filed April 13, 1918. Serial No. 228,419.

*To all whom it may concern:*

Be it known that I, EUGENE BUSH, a citizen of the United States, residing at Washington, in the District of Columbia, have invented certain new and useful Improvements in Valve Construction; and I do hereby declare the following to be a full, clear, and exact description of the invention, such as will enable others skilled in the art to which it appertains to make and use the same.

This invention relates to valve construction and particularly to the construction of float valves for the flush tanks of water closets, or other flush tanks.

The primary object of the invention is to so improve the construction of such valve mechanism that much trouble heretofore encountered in the use of such valves will be eliminated, the adjustment of the parts facilitated, and the life of the mechanism lengthened.

A specific object of the invention is to provide an improved construction of valve seat whereby different sizes of rubber float valves may be used in the same seat.

A further specific object of the invention is to provide an improved construction of valve seat whereby its removal and replacement in position will be greatly facilitated.

A further specific object of the invention is to so construct the valve mechanism that all danger of corroding or rusting of the metallic threaded parts will be obviated.

With these objects in view, the invention consists in the improved construction, arrangement and combination of the parts of a device of the character specified, which will be hereinafter fully described and afterward specifically claimed.

In order that the construction and operation thereof may be readily comprehended, I have illustrated an approved embodiment of my invention in the accompanying drawings, and will now proceed to fully describe the same in connection with said drawings, in which—

Figure 1 represents a view partly in vertical section and partly in elevation, of valve mechanism constructed in accordance with my invention, and Fig. 2 represents a top plan view of the valve seat, detached.

Like reference characters mark the same parts in both of the figures of the drawing.

Referring particularly to the drawing, 4 indicates the valve seat, usually cast but which might be stamped up of wrought iron, if desired.

5 indicates the usual overflow pipe communicating with the escape pipe 6 through a branch 7 in the usual manner.

8 indicates the usual bulb or float valve, usually made of rubber and provided with a valve stem 9 which is slidably mounted in and is guided by vertical guides or sleeves 10 at the outer end, of a usually horizontal arm 11 adjustably secured upon the overflow pipe 5, in any approved manner, being shown in this instance as by a ring 12 and fastening screw 13.

The escape pipe 6 projects downward through the bottom 14 of the tank and is held firmly in position by a threaded sleeve nut 15 and is provided with a suitable gasket 16$^a$ to prevent leakage.

Above the bottom 14 the waste pipe is extended, as at 15$^a$ and is interiorly threaded as at 16 and receives the lower threaded end 17 of the valve seat 4, the bottom of which is exteriorly threaded into this extension 15$^a$, a gasket 18 being interposed between said lower end and a shoulder 19 on the extension 15$^a$ to prevent the water in the escape pipe reaching the threads, thus to avoid the corroding or rusting of the threads.

At the junction of the lower end of the valve seat with the main body 20 thereof is an annular projecting flange 21 which rests upon the upper edge of the extension 15$^a$ of the waste pipe, and as a preventive of the water in the tank reaching the threads, a gasket 22 is interposed between the said top of the extension 15$^a$ and said annular flange 21, so that when the valve seat is firmly fixed in position the water in the tank will be excluded from the threads by the gasket 22 and the water in the escape pipe is similarly excluded by the gasket 18.

Above the flange 21, the valve seat flares outward in curved lines and affords a seat of continually increasing width to receive the ordinary bulb valve 8, the outer edge of the flared seat being provided with notches 23 so that it may be grasped by the fingers to seat or unseat it, and in order that a wrench or other tool may be applied to it to jar it loose in the event of its sticking, the notches are provided at each end with abrupt, substantially square ends 24.

In order to freely permit the hand to turn around with the valve seat without striking the overflow pipe, the pipe 5 is set a sufficient distance from the valve seat by lengthening the branch 7, and the arm 11 is likewise correspondingly lengthened to assure the positioning of the valve stem and valve centrally above the valve seat.

Very often when a plumber is called to make repairs to a flush tank, he finds the bulb valve leaking or otherwise disabled and in endeavoring to seat a new bulb, he finds that all he has are of sizes different from the one he is removing. Ordinarily, he would be compelled to wait until he could procure one of the same size. This difficulty is entirely obviated by my construction of valve seat which, owing to its outwardly flaring form, will accommodate bulb valves of different sizes.

Usually the bulbs swell, often to twice their original size, and this shape of the valve seat will accommodate such swelled bulbs and avoid the usual necessity of furnishing a new bulb.

The utility and simplicity of my invention will be evident from the foregoing and I desire to be understood that changes and variations may be made from the specific construction described, without departing from the spirit and scope of the invention.

Having thus fully described my invention, what I claim as new and desire to secure by Letters Patent of the United States, is:—

1. A valve seat construction for tanks, comprising a pipe to project through the bottom of the tank and having an upper extension of larger internal diameter than the pipe to provide a shoulder, a valve seat screw threaded into said extension and having a flange above said extension, packing means between said flange and extension above the screw threads, and packing means between said seat and shoulder at the lower portion of the screw threads.

2. The combination with a tank, a waste pipe projecting below and through the bottom thereof and having an upper extension projecting into the tank, of a valve seat threaded into the upward extension and means for excluding the water of the tank and waste pipe from contact with the valve seat threads, said means comprising a gasket between the bottom of the valve seat and an interior shoulder in the extension, an external annular flange on the valve seat at the top of the valve seat threads and projecting over the top edge of the extension, and a gasket between said flange and the top of the extension.

3. A valve seat construction comprising a waste pipe to project through the bottom of a tank, a valve seat having a lower portion threaded into the upper portion of said pipe and having a flange above said pipe, and packing means between said flange and pipe, said valve seat above said flange being flared on curved lines outwardly to accommodate bulb valves of different sizes, the edge of said valve projecting outwardly and being provided with notches for the reception of the fingers and tools.

4. A valve seat for flush tanks, having a lower threaded portion to threadedly engage a waste pipe and having a portion thereabove flared outwardly on curved lines to accommodate bulb valves of different sizes, the edge of said valve seat projecting outwardly and being notched for the engagement of the fingers and tools.

In testimony whereof I have signed my name to this specification in the presence of a subscribing witness.

EUGENE BUSH.

Witness:
SAML. W. COCKRELL.